United States Patent
Alcantar et al.

(10) Patent No.: US 9,163,374 B2
(45) Date of Patent: Oct. 20, 2015

(54) USE OF CACTUS MUCILAGE AS A DISPERSANT AND ABSORBANT FOR OIL IN OIL-WATER MIXTURES

(71) Applicant: University of South Florida, Tampa, FL (US)

(72) Inventors: Norma A. Alcantar, Tampa, FL (US);
Dawn I. Fox, East Bank Demerara (GY);
Sylvia Thomas, Orlando, FL (US);
Ryan G. Toomey, Tampa, FL (US)

(73) Assignee: University of South Florida, Tampa, FL (US)

( * ) Notice: Subject to any disclaimer, the term of this patent is extended or adjusted under 35 U.S.C. 154(b) by 47 days.

(21) Appl. No.: 13/687,595

(22) Filed: Nov. 28, 2012

(65) Prior Publication Data

US 2013/0087507 A1    Apr. 11, 2013

Related U.S. Application Data

(63) Continuation of application No. PCT/US2011/038549, filed on May 31, 2011.

(60) Provisional application No. 61/349,382, filed on May 28, 2010.

(51) Int. Cl.
*B01D 15/04* (2006.01)
*C02F 1/28* (2006.01)
(Continued)

(52) U.S. Cl.
CPC ............. *E02B 15/00* (2013.01); *B01J 20/24* (2013.01); *C02F 1/286* (2013.01); *C02F 1/682* (2013.01);
(Continued)

(58) Field of Classification Search
None
See application file for complete search history.

(56) References Cited

U.S. PATENT DOCUMENTS

| | | | |
|---|---|---|---|
| 2,117,378 A | | 5/1938 | Tiffany |
| 2,845,363 A | * | 7/1958 | Gutzeit .................. 106/205.01 |

(Continued)

FOREIGN PATENT DOCUMENTS

| | | |
|---|---|---|
| JP | 08001181 A | 1/1996 |
| JP | 2000153150 A | 6/2000 |

OTHER PUBLICATIONS

Young et al. "Chapter 9: Mucilage of *Opuntia ficus-indica* for Use as a Flocculant of Suspended Particulates and Arsenic" in Arsenic Contamination of Groundwater: Mechanism, Analysis, and Remediation, 2008, pp. 207-225, John Wiley & Sons, Inc.*

(Continued)

*Primary Examiner* — Nam Nguyen
*Assistant Examiner* — Clare Perrin
(74) *Attorney, Agent, or Firm* — Robert J. Varkonyi; Smith & Hopen, P.A.

(57) ABSTRACT

Despite advances in off-shore oil exploration and drilling technology, accidental oil spills do occur. Depending on their magnitude and location, irreparable damage may be inflicted on marine and coastal ecosystems. Emulsification of a water/surfactant/oil system results in the production of oil droplets and this depends on the formulation and composition variables, mixing characteristics and system preparation. Thus, research is ongoing on improving methods of cleaning up oil spills. Cactus mucilage was used to disperse and absorb oil from a simulated oil slick in different salt concentrations. Results show correlations between emulsion properties and interfacial characteristics of mucilage as function of aqueous phase salinity. Mucilage powder added to the oil floating on the water dispersed the oil film and absorbed the oil while remaining afloat, facilitates removal of the oil-mucilage aggregate. This invention is a competitive treatment for oil spill remediation with the added advantage of being more environmentally friendly.

12 Claims, 3 Drawing Sheets

(51) Int. Cl.
| | |
|---|---|
| *B01D 15/00* | (2006.01) |
| *E02B 15/00* | (2006.01) |
| *B01J 20/24* | (2006.01) |
| *C02F 1/68* | (2006.01) |
| *C02F 1/00* | (2006.01) |
| *C02F 101/32* | (2006.01) |
| *C02F 103/00* | (2006.01) |

(52) U.S. Cl.
CPC ..... *B01J 2220/485* (2013.01); *B01J 2220/4825* (2013.01); *C02F 2101/32* (2013.01); *C02F 2103/007* (2013.01)

(56) References Cited

U.S. PATENT DOCUMENTS

| | | | |
|---|---|---|---|
| 4,855,284 A * | 8/1989 | Emoedi | 514/13.2 |
| 5,000,857 A * | 3/1991 | Kunkel | 210/708 |
| 7,014,776 B1 | 3/2006 | DeBusk | |
| 7,192,527 B2 * | 3/2007 | Reddy | 210/708 |
| 7,455,863 B2 | 11/2008 | Hamann | |
| 2005/0092049 A1 | 5/2005 | Johnson | |
| 2007/0261571 A1 | 11/2007 | Esteve | |
| 2008/0107591 A1 | 5/2008 | Cisneros | |

OTHER PUBLICATIONS

University of South Florida, "Natural water purification with cactus mucilage", 2006, p. 1.*

Goycoolea et al. "Pectins from *Opuntia* spp.: A Short Review", J. PACD, 2003, pp. 17-29.*

LabSource, "Whatman Quantitative Papers", accessed Oct. 9, 2014, pp. 1-2.*

Buttice, et al., Removal of sediment and bacteria from water using green chemistry. Environmental Science & Technology, 2010. 44(9): p. 3514-3519.

Cho and Heuzey, 2008. Dynamic scaling for gelation of a thermosensitive chitosan-beta glycerophosphate hydrogel. Colloid Polym Sci 286:427-434.

Goycoolea, and Cardenas, Pectins from *Opuntia* spp.: A short review. Journal of the Professional Association for Cactus Development 2003, 5, 17-29.

"The Use of Chemical Dispersants to Treat Oil Spills" Technical bulletin No. 4: International Tanker Oil Pollution Federation Ltd., 2005.

Medina-Torres, et al., Rheological properties of the mucilage gum (*Opuntia ficus indica*). Food Hydrocolloids 2000, 14, 417-424.

Young, et al., The Mexican Cactus as a New Environmentally Benign Material for the Removal of Contaminants in Drinking Water, in Materials Science of Water Purification, M.A. Shannon, et al., Editors. 2006, Mater. Res. Soc. 930E-0930-JJ01-01: Warrendale, Pa.

Mukherjee and Wrenn, Effects of Physical properties and dispersion conditions on the chemical dispersion of crude oil. Envirn Engin Sci. Apr. 2011, 28(4): 263-273.

Corexit® 9550 MSDS, Nalco Energy Services, L.P., Jun. 14, 2005.

National Research Counsel. Committee on understanding oil spill dispersants: efficacy and effects. Washington, DC; The National Acadamies Press, 2005, p. xviii, Appendix E, pp. 355-378.

Pollino and Holdway, Toxicity testing of crude oil and related compounds using early life stages of the crimson-spotted rainbowfish (*Melanotaenia fluviatilis*). Ecotoxicol Envirn Saf. 2002; 52, 180.

Region IV Regional Response Team Dispersant Use Policy; Oct. 8, 1996.

Russell, C. E.; Felker, P., The Prickly-Pears (*Opuntia* spp., Cactaceae): A Source of Human and Animal Food in Semiarid Regions. Economic Botany 1987, 41, (3), 433-445.

Elana Schor "Ingredients of Controversial Dispersants Used on Gulf Spill Are Secrets No More". Energy and Environment, NY Times (Jun. 9, 2010).

Thibodeaux, et al. Marine oil fate: Knowledge gaps, basic research, and developmental needs; a perspective based on the Deepwater Horizon Spill. Envirn Engin Sci. Feb. 2011, 28(2): 87-93.

Trachtenberg, and Mayer, Composition and Properties of *Opuntia ficus-indica* Mucilage. Phytochemistry 1981, 20, 2665-2668.

Young, et al., Using the Mexican cactus as a natural-based process for removing contaminants in drinking water. Polymeric Materials: Science and Engineering Preprints, 2005. 93: p. 965-966.

Young, K. The Mucilage of *Opuntia ficus indica*: a natural, sustainable and viable water treatment technology for use in rural Mexico for reduction turbidity and arsenic contamination in drinking water. Master's Thesis, University of South Florida, Tampa, 2006.

Young, et al. Mucilage of *Opuntia ficus-indica* for use as a flocculant suspended particulates and arsenic, in Arsenic Contamination of Groundwater: Mechanism, Analysis, and Remediation, S. Ahuja, Editor. 2008, John Wiley and Sons, Inc.: New York).

International Search Report for International Application No. PCT/US2011/038549, International filing date of May 31, 2011, mailed on Jan. 18, 2012.

Non-Final Office Action issued on Apr. 21, 2010 for U.S. Appl. No. 11/934,932, filed Nov. 5, 2007.

Canevari, Gerard P., et al. Development of the "Next Generation" Chemical Dispersants. Control Technology—R&D (1973) 231-240.

Ghotli, Reza Afshar, et al. Liquid-Liquid Mixing in Stirred Vessels: A Review (2013). Chemical Engineering Communications, 200:5, 595-627, DOI: 10.1080/00986445.2012.717313.

Toomey, Ryan, et al. Biocompatible Materials Based on Cactus Mucilage for Oil Remediation, Mitigation and Recovery. Proposal prepared in response to Gulf of Mexico Research Initiative. Request for Proposals: Individual Investigators or Collaborative Efforts. LOI Submission No. GOMRI2015-V-242.

Kopriwa, Nicole, et al. A Critical Review of the Application of Drop-Population Balances for the Design of Solvent Extraction cols. I. Concept of Solving Drop-Population Balances and Modeling Breakage and Coalescense. Solvent Extraction and Ion Exchange, 30: 683-723, 2012.

Worner, Martin. Numerical modeling of multiphase flows in microfluidics and micro process engineering: a review of methods and applications. Microfluid Nanofluid (2012) 12:841-886.

Frising, Tom, et al. The Liquid/Liquid Sedimentation Process: From Droplet Coalescence to Technologically Enhanced Water/Oil Emulsioni Gravity Separators: A Review, Journal of Dispersion Science and Technology, 27:7, 1035-1057, DOI: 10.1080/01932690600767098, Published online Feb. 6, 2007.

Liao, Yixiang, et al. A literature review on mechanisms and models for the coalescence process of fluid particles. Chemical Engineering Science 65 (2010) 2851-2864.

* cited by examiner

USE OF CACTUS MUCILAGE AS A DISPERSANT AND ABSORBANT FOR OIL IN OIL-WATER MIXTURES

CROSS REFERENCE TO RELATED APPLICATION

This application is a continuation of and claims priority to International Patent Application No. PCT/US11/038549, entitled "Use Of Cactus Mucilage As A Dispersant And Absorbant For Oil In Oil-Water Mixtures," filed on May 31, 2011 which is a non-provisional of and claims priority to U.S. Provisional Patent Application No. 61/349,382, with the same title, filed on May 28, 2010, the contents of which are herein incorporated by reference.

GOVERNMENT SUPPORT

This invention was made with government support under Grant Numbers 1057897 and 1034849 awarded by National Science Foundation. The government has certain rights in the invention.

FIELD OF INVENTION

This invention relates to field water purification. Specifically, a water purification method using plant mucilage.

BACKGROUND OF INVENTION

Louisiana's outer continental shelf is the most extensively developed region in the United States, and over the last two decades, drilling activities have increased. This area is also home to some of the most sensitive ecosystems in the world. The coastal wetlands and the Gulf contribute ~28% of the total volume of U.S. fisheries and is also a rich habitat for several rare species. The wetland ecosystems buffer the landmass from hurricanes and tropical storms. The Mississippi river drains one-third of the United States and delivers the largest amount of sediment to the continental shelf.

Approximately 3 million gallons of crude oil are spilled into U.S. marine waters annually (National Research Counsel. Committee on understanding oil spill dispersants: efficacy and effects. Washington, D.C.; The National Acadamies Press, 2005, p. xviii, 377). While trends in volume and frequency of accidental releases have been decreasing for several decades, large spills, such as the recent massive oil spill in the Gulf of Mexico from the Macondo/Deepwater Horizon, occur intermittently (Mukherjee and Wrenn, Effects of Physical properties and dispersion conditions on the chemical dispersion of crude oil. Envirn Engin Sci. April 2011, 28(4): 263-273). Pollution of seawater by oil, be it crude oil or fractions of crude oil, occasioned by accidents, off-shore drilling operations, and/or discharge of ballast or spillage from oil tankers, results in the formation of a continuous film or slick of oil which tends to continuously spread. When these large spills occur, environmental and economic effects, including contamination of animals and shorelines, can be devastating. Oils spilled at sea lead to processes that alter the chemical properties of the oil. Once oil enters the sea it moves on the water's surface by advection and spreading. This movement increases the exposure area of the oil to subsequent weathering processes, one of which is emulsification. The dispersion of oil droplets in water (O/W emulsions), including natural dispersants in its formulation, contributes to a removal of the oil from the sea surface into the water column for rapid biodegradation.

The blowout from the Deepwater Horizon spill produced a gas/oil mixture and was located ~1,500 m below the sea surface, where the specific conditions are high pressure (~160 atm) and low temperature (48° C.). The oil reservoir was 13,000 ft (4,000 m) below sea bottom. The Flow Rate Technical Group convened to study the amount and the flow rate of the oil released has estimated that about 4.7-5.5 million barrels (1 bbl=160 L) were released and the flow rates range from 53,000 to 62,000 barrels per day. Oil dispersants were injected into the gushing plume at a volume ratio of ~1% (~0.8-0.9 L per 100 L oil) to disperse the oil/gas mixture with the goal of minimizing the overall environmental impact, partly to prevent oil from reaching the coastline.

Oil dispersant compositions are applied on the oil slicks, generally by spraying. Dispersants, typically some amphiphilic surfactant, promote the formation of oil droplets that can be dispersed into the water column (Clayton et al., Oil spill dispersants: mechanisms of action and laboratory tests. CRC Press, Inc. 1993, Boca Raton, Fla.; Mukherjee and Wrenn. Effects of Physical properties and dispersion conditions on the chemical dispersion of crude oil. Envirn Engin Sci. April 2011, 28(4): 263-273) by reducing the interfacial tension by accumulating at the oil-water interface making it easier for normal ocean movement to disperse the oil and interacting with both the oil and water phases simultaneously, allowing oil droplets to be transported vertically and horizontally in the water column thereby diluting the oil in the seawater. The primary constituents of chemical dispersants include low molecular weight surfactants and solvent. For instance, the formulation of Corexit® 9550 contains petroleum distillates, low molecular weight alcohols (which are the surfactants), and sulfonic acid salts (Corexit® 9550 MSDS, Nalco Energy Services, L.P., Jun. 14, 2005). Corexit® 9500, which was used to address the oil leakage from the Deepwater Horizon, contains about 48% nonionic surfactants, including ethoxylated sorbitan mono- and tri-oleates and sorbitan monooleate, and 35% anionic surfactants, including sodium dioctyl sulfosuccinate, in a solvent consisting of a mixture of food-grade aliphatic hydrocarbons (National Research Counsel. Committee on understanding oil spill dispersants: efficacy and effects. Washington, D.C.; The National Acadamies Press, 2005, p. xviii, 377; Pollino and Holdway, Toxicity testing of crude oil and related compounds using early life stages of the crimson-spotted rainbowfish (*Melanotaenia fluviatilis*). Ecotoxicol Environ Saf. 2002; 52, 180) and contains 2-butoxyethanol, which is toxic and was identified as a causal agent in the health problems experienced by cleanup workers after the 1989 Exxon Valdez oil spill (Elana Schor "Ingredients of Controversial Dispersants Used on Gulf Spill Are Secrets No More". Energy and Environment, NY Times (Jun. 9, 2010)).

The oil dispersants disintegrate the cohesive oily film into small droplets and disperse the droplets into the water column, thereby breaking the film and permitting the transfer of light and air from the atmosphere. Petroleum distillates are necessary to facilitate penetration of the surfactants into the oil, wherein the surfactants ultimately form micelles with the help of wave energy. During micelle formation, oil is trapped in the interior of the micelle, effectively forming small droplets that pinch off of the larger oil slick. Electrostatic double layer forces and/or steric forces between the micelles minimize re-coalescence. To achieve an efficient dispersion, oil droplets must be less than roughly 100 µm. Even smaller droplets are preferred in order to increase surface area to volume ratio enhances biodegradation.

However, the relationship between the design of dispersants and effectiveness in oil spills is not well understood.

Several factors play a role in effective dispersion, and these factors are not well understood ("The Use of Chemical Dispersants to Treat Oil Spills" Technical bulletin No. 4: International Tanker Oil Pollution Federation Ltd., 2005). Studies have shown that the physical and chemical properties of the oil, composition of the dispersant, mixing energy, mixing time, fluid dynamics, temperature, and salinity are all important factors that affect dispersant performance (National Research Counsel. Committee on understanding oil spill dispersants: efficacy and effects. Washington, D.C.; The National Acadamies Press, 2005, p. xviii, 377; Mukherjee and Wrenn. Effects of Physical properties and dispersion conditions on the chemical dispersion of crude oil. Envirn Engin Sci. April 2011, 28(4): 263-273). First, there must be a minimum wave energy. For instance, dispersants in the Exxon Valdez spill were ineffective due to a relatively calm waters; enough shear was not present to disperse the oil. Too much wave energy, may also be deleterious to effective dispersion. The properties of the oil are also important. More viscous oil is generally resistant to dispersion. This is especially important in that the viscosity of oil rapidly increases after a spill, as lower weight components quickly evaporate. Moreover, oil in water emulsifications, which sometimes form in spills, also restrict the ability of surfactant to reach the oil/water interface. Finally, the properties of the dispersant are important. The majority of formulations are proprietary, and so it is difficult to make intelligent decisions on a particular dispersant, other than through empirical laboratory tests.

Corexit is most effective on oil slicks, where the dispersant comes into direct contact with the oil. However, at the Deepwater Horizon spill site, the dispersant was introduced at the exit of the broken pipe, where oil is travelling at several hundreds of miles an hour, and likely broke the oil into small particles. Further, the dispersion efficiency of Corexit® 9500 on large, underwater oil leaks with high flow rates is unknown. It is uncertain if the dispersant is effective under such conditions, which may lead to semi-stable emulsions that contribute to the large underwater oil plumes. Moreover, Corexit® 9550 contains 2-butoxyethanol, which is toxic and was identified as a causal agent in the health problems experienced by cleanup workers after the 1989 Exxon Valdez oil spill (Elana Schor "Ingredients of Controversial Dispersants Used on Gulf Spill Are Secrets No More". Energy and Environment, NY Times (Jun. 9, 2010)). Laboratory experiments showed that dispersants increased toxic hydrocarbon levels in fish by a factor of up to 100 and may kill fish eggs (Region IV Regional Response Team Dispersant Use Policy; Oct. 8, 1996).

Depending on their magnitude and location, irreparable damage may be inflicted on marine and coastal ecosystems. This oily film causes a barrier, preventing the transfer of light and air from the atmosphere into the seawater, and coats maritime life in a detrimental oil slick. One aspect to the Deep Horizon spill is that a significant amount of the hydrocarbon mass does not emerge on the sea surface but remains in the water column. As droplets approach the continental shelf, they may interact with subsea sediments, animals, and vegetation. The long-term impact of oil on the ecosystem, including oxygen depletion, oil contact with biota, such as finfish and shellfish, acute fish toxicity, vegetation oiling, dispersion and advection by wind and water onto beaches, wetlands, bays, harbors, estuaries, is unknown (Thibodeaux, et al. Marine oil fate: Knowledge gaps, basic research, and developmental needs; a perspective based on the Deepwater Horizon Spill. Envirn Engin Sci. February 2011, 28(2): 87-93). Once the oil reaches the bed sediment either at depth, in the marshlands, or on the beaches, its transport is one of multiphase systems traveling through or lodging in porous media. The transported oil will influence—even cause—transport or deposition/aggregation of bacteria and other (bio) particulates. These effects are particularly poignant in deep water, where mobility, biological uptake, and degradation processes are very slow (Thibodeaux, et al. Marine oil fate: Knowledge gaps, basic research, and developmental needs; a perspective based on the Deepwater Horizon Spill. Envirn Engin Sci. February 2011, 28(2): 87-93). Moreover, laboratory experiments showed that dispersants increased toxic hydrocarbon levels in fish by a factor of up to 100 and may kill fish eggs (Region IV Regional Response Team Dispersant Use Policy; Oct. 8, 1996).

However, as evidenced above, there is a continuing need to develop and improve spill response technologies. Although environmental damage cannot be completely prevented when accidental releases of petroleum occur, it may be possible to minimize the damage if a variety of complementary response alternatives are available. Accordingly, a composition of plant mucilage is useful for sequestering oil and trapping it for collection and dispersing the oil.

SUMMARY OF THE INVENTION

Cactus mucilage, an extract from the *Opuntia ficus-indica*, is used to disperse and absorb oil from an oil-water mixture. An oil slick was simply simulated by adding oil to water (both de-ionized and saline). A quantity of mucilage powder was added to the oil floating on the air water interface. Two alternative powdered materials were used for comparison: cornstarch and kaolin. The mucilage was able to disperse the oil film as well as absorb it while remaining afloat. This facilitates the removal of the oil-mucilage aggregate. In some embodiments, the mucilage and oil are stirred, thereby forming a stable dispersion. This is useful where the dispersant is used under the water. As is evident, the mucilage functions both on the surface and under the water to disperse oil under the water and/or aggregate with the oil facilitating removal on the surface of the ocean.

This invention addresses the problem of cleaning up oil spills caused by accidental discharges from off-shore petroleum drilling operations. It may be used to disperse and absorb petroleum and natural based oil products including crude oil, paraffins, aromatics, asphaltics, and naphthalenes. Two challenges are addressed by the mucilage; dispersing the oil due to its surfactant properties and also absorbing/adsorbing the oil. Further the mucilage has the advantage of being a natural, plant-based product which may be produced by sustainable agriculture, and the mucilage itself is environmentally benign and non-toxic.

Most plant species produce an exopolysaccharide, a polymer of mono- and polysaccharides and proteins bonded by glycosidic bonds, referred to as mucilage. Plants secrete the substance to slow water loss, aid germination, and store food.

The tuna cactus (*Opuntia ficus indica*) mucilage produced by the flattened pads of this cactus was of particular interest. It can easily be recognized by its green, thick long pads, one linked to the next. The nopal plants are very inexpensive to cultivate and edible. Nopal pads are formed of complex carbohydrates that have the ability to store and retain water, allowing these plants to survive in extremely arid environments. Nopal mucilage is a neutral mixture of approximately 55 high-molecular weight sugar residues composed basically of arabinose, galactose, rhamnose, xylose, and galacturonic acid and has the capacity to interact with metals, cations and biological substances.

Mucilage is used in producing agar and used as an adhesive. Importantly, mucilage swells in water but is insoluble. As such, the substance has the potential to precipitate ions, bacteria and particles from aqueous solutions. Further, the material has unique surface active characteristics, making it an ideal candidate for enhancing dispersion properties, creating emulsifications, and reducing surface tension of high polarity liquids.

The invention includes a method of dispersing and absorbing oil from water using natural flocculants obtained from cactus (i.e. cactus mucilage), okra, and *moringa*. The extraction techniques and the methodology for using the mucilage obtain higher oil dispersion and removal than previous methods.

Powdered compositions of the present invention, when added to an oil-in-water mixture where the oil floats on the water is able to disperse the oil and absorb the oil while floating on the oil-water interface. Once the oil is absorbed, the mucilage facilitates removal of the oil via scooping or seiving. The dispersant action has been found more noticeable in de-ionized water.

The powdered mucilage showed a more useful interaction with the oil than the cornstarch or kaolin due to dispersive action on the oil, better adhesion of the oil to the mucilage particles than to kaolin, the mucilage-oil aggregate remaining afloat (and thus easier to remove) and the mucilage remains intact longer than the cornstarch or kaolin, thus facilitating the removal of the oil-mucilage aggregate. This invention has the potential to be a competitive treatment for oil spill remediation with the added advantage of being more environmentally friendly. The mucilage is a plant-based natural polymer, which can be extracted from sustainably grown cacti, okra, or *moringa*. It is also non-toxic and biodegradable.

BRIEF DESCRIPTION OF THE DRAWINGS

For a fuller understanding of the invention, reference should be made to the following detailed description, taken in connection with the accompanying drawings, in which:

FIG. 1*a* shows the initial patch of oil (1 ml), FIG. 1*b* shows the addition of the mucilage (~10 µg), and FIG. 1*c* is the oil mixture 3 seconds after mucilage was added, FIG. 1*d* shows the oil 5 seconds after mucilage was added, and FIG. 1*e* shows the complete dissipation of the green and mucilage removal.

DETAILED DESCRIPTION OF THE PREFERRED EMBODIMENT

Figure 1:
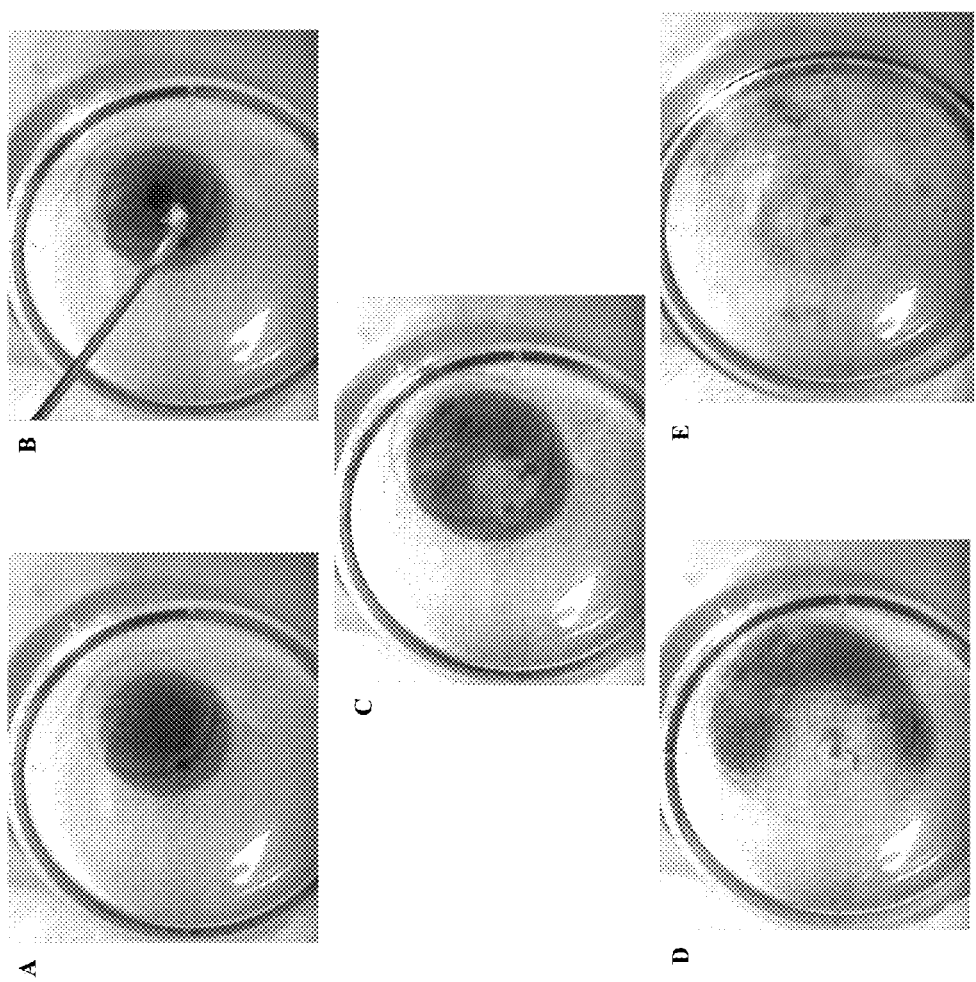
FIGS. 1*a-e* are images of a tinted oil mixture with low and high hydrocarbons, showing the dispersion of the labeled oil with cactus mucilage.

Earthquakes can cause serious damage in drinking water systems, mainly in areas with high population density. Similarly, ocean water contamination by crude oil spills and the use of synthetic dispersants affect the environment negatively. Emergency response systems to treat water affected by disasters that are sustainable, low cost, and benign to the environment are needed. The use of natural coagulants and dispersants to remediate water can greatly increase the quality of life and global health. *O. ficus-indica*, is a cactus that is found in most areas of the globe that offer dry arid climates. Although native to Mexico, the *O. ficus-indica* has spread throughout the world and can currently be found growing in many regions including South America, North America, India, Africa and many of the countries surrounding the Mediterranean Sea (Russell, C. E.; Felker, P., The Prickly-Pears (*Opuntia* spp., Cactaceae): A Source of Human and Animal Food in Semiarid Regions. *Economic Botany* 1987, 41, (3), 433-445). Further, *O. ficus-indica* grows at an extremely fast rate, with reports that the fruit from the cactus could be harvested in as little as two to three months after the cactus is planted. In addition, vegetation production (dry weight) from the plant may be as much as 20,000-50,000 kg/ha/yr (1 ha=1 hectare=10,000 $m^2$) and fruit production of 8,000-12,000 kg/ha/yr (Russell, C. E.; Felker, P., The Prickly-Pears (*Opuntia* spp., Cactaceae): A Source of Human and Animal Food in Semiarid Regions. *Economic Botany* 1987, 41, (3), 433-445). Mucilage extracted from the *Opuntia ficus-indica* cactus and other natural plants known to have similar properties to cactus mucilage such as *Hibiscus esculentus* (i.e., okra) and *Moringa oleifera* (i.e., *moringa*) have shown to be excellent natural coagulants and dispersant of in the removal of sediments, heavy metals such as arsenic and lead, mineral oil, and several strains of bacteria suspended in synthetic hard and soft waters. However, mucilage was also found to possess unexpected biosequestering capacity for oil, having the capacity to disperse oil in water columns and at the air-water interface. The mucilage from the *Opuntia ficus-indica* is an ideal material for applications in water treatment because it is readily available worldwide, inexpensive, easy to process.

Natural and model surfactants were tested to determine efficacy in specially designed flow channels that mimic the shear conditions encountered at sea. Dispersion efficiency was tested in specially built fluidic channels, where flow and shear rates can be carefully controlled. Oil/water mixtures, labeled with a florescent dye, were flown through the channels, with surfactant added to the water phase. Fluorescent microscopy to monitor dispersion effectiveness in real-time, in situ observation of oil dispersion as a function of flow rate.

Unless otherwise noted, the terms used herein are to be understood according to conventional usage by those of ordinary skill in the relevant art. In addition to the definitions of terms provided below, definitions of common terms in molecular biology may also be found in Rieger et al., 1991 Glossary of genetics: classical and molecular, 5th Ed., Berlin: Springer-Verlag; and in Current Protocols in Molecular Biology, F. M. Ausubel et al., Eds., Current Protocols, a joint venture between Greene Publishing Associates, Inc. and John Wiley & Sons, Inc., (1998 Supplement). It is to be understood that as used in the specification and in the claims, "a" or "an" can mean one or more, depending upon the context in which it is used. Thus, for example, reference to "a leaf" can mean that at least one leaf can be utilized.

As used herein, "about" means approximately or nearly and in the context of a numerical value or range set forth means±15% of the numerical.

Example 1

Through simple extraction processes, two fractions of mucilage gum can be obtained from fresh cut *Opuntia ficus-indica* cactus pads including a Gelling Extract (GE) and Non-Gelling Extract (NE) (Goycoolea, and Cardenas, Pectins from *Opuntia* spp.: A short review. *Journal of the Professional Association for Cactus Development* 2003, 5, 17-29; Young, K. The Mucilage of *Opuntia ficus indica*: a natural, sustainable and viable water treatment technology for use in rural Mexico for reduction turbidity and arsenic contamination in drinking water. Master's Thesis, University of South Florida, Tampa, 2006). Mucilage is thought to consist of up to 55 sugars, mainly arabinose, galactose, rhamnose, xylose, glucose and uronic acids, the percentage of which varies with mucilage type (Goycoolea, F. and Cardenas, Pectins from *Opuntia* spp.: A short review. *Journal of the Professional Association for Cactus Development* 2003, 5, 17-29; Trachtenberg, and Mayer, Composition And Properties Of *Opuntia-Ficus-Indica* Mucilage. *Phytochemistry* 1981, 20, 2665-2668; Medina-Torres, et al., Rheological properties of the mucilage gum (*Opuntia ficus indica*). *Food Hydrocolloids* 2000, 14, 417-424). Literature has previously indicated that these extracts, particularly the GE, undergo several property alterations including viscosity changes in the presence of diatomic ions such as $Ca^{2+}$ (Goycoolea, and Cardenas, Pectins from *Opuntia* spp.: A short review. *Journal of the Professional Association for Cactus Development* 2003, 5, 17-29; Medina-Torres, et al., Rheological properties of the mucilage gum (*Opuntia ficus indica*). *Food Hydrocolloids* 2000, 14, 417-424). Moreover, cactus mucilage is non-toxic.

Cactus plants were purchased from Living Stones Nursery, Tucson, Ariz. All mucilage types extracted were stored dry and at room temperature. Cactus pads were cleaned and boiled in milli Q water until they became tender (approximately 15-20 minutes). The soft pads were then liquefied in a blender. The pH of the resulting suspension was then neutralized and the solids and liquid supernatant were separated in a centrifuge at 4000 rpm. The solids were suspended in a 50 mM NaOH/sodium metaphosphate solution, stirred, washed and acidified with HCl to let precipitate at a pH=2. Then, the solids were centrifuged and resuspended again in water and the pH was adjusted with NaOH to a value of 8. Then, they were filtered, and washed with ethanol, isopropanol or acetone. This procedure produced a precipitate of the gelling extract. To produce a non-gelling extract, liquefied plant pads were neutralized as with the gelling extract, centrifuged and the liquid supernatant collected. Sodium chloride (1M) was added to the supernatant, mixed, and filtered using Whatman #40. Acetone was then added at a ratio of 1:2 (acetone to pulp) to form a precipitate. The filtrate was mixed with full-strength acetone or isopropanol in a 2:3 supernatant to solvent ratio to precipitate the mucilage. Both precipitates (gelling and non-gelling) were dried overnight at room temperature (20 degrees Celsius) then oven dried overnight at 50 degrees Celsius. The dried precipitate from the solids and the supernatant were ground to a powder and stored in a closed container at room temperature.

The action of cactus mucilage on oil floating on water was investigated. The mucilage has shown surfactant behavior in lowering the surface tension of water and hence may be able to disperse the oil. 50 μl oil (Pennzoil engine oil which contains a blue dye) were added to 1 ml of different concentrations of mucilage suspensions ranging from 0.01 to 4000 mg/l. The surface tension was measured in a KVS Sigma 701 Tensiometer as a function of mucilage concentration. Control water solution were used to calibrate and check the instrument. Water provides a value of 72 mN/m always. The oil/water/mucilage solutions have a surface tension lower than water and it reaches a constant value of 60 mN/m at high concentrations of mucilage, such as 4-8 wt % of mucilage to oil/water concentration.

Approximately 1 ml oil was added to 100 ml DI water, as seen in FIG. 1a. About 10 μg to 50 mg mucilage powder (gelling extract) was added to the oil floating on the water. Any interactions were observed using the distribution of the blue color throughout the suspension as against being concentrated at the air interface (without stirring). In DI water, the mucilage appeared to absorb the oil it came into contact with; the oil adhered to the mucilage. About 10 μg of mucilage showed dispersion of the oil began to occur within seconds of mucilage addition, as seen in FIG. 1b. Within 5 seconds, the mucilage had largely dispersed the oil, seen in FIG. 1c. A clear region formed around the mucilage aggregate indicating dispersion of the oil, likely from the mucilage preferentially attracting water. Mucilage almost completely disrupted the dyed layer, occurred in the DI water, as seen in FIG. 1d, indicating that the oil is broken into small particles by the mucilage. Further, the cactus mucilage was used without the need for secondary solvents. The mucilage aggregate with adhered oil remains afloat and was collected by scooping out the aggregate, though any means of surface removal is contemplated. Testing of the nongelling extract showed it had similar effects to the oil as the gelling extract. The order of interaction observed was NE>GE, water; the blue color remained distributed throughout the suspension of NE longer than with GE or water. The experiment was repeated with a 3.5% sodium chloride solution. With saline solution, the oil spread out more thinly on the water surface and no oil dispersion was seen when mucilage was added, as with DI water. However, the mucilage-oil aggregate formed and could be removed from the surface of the water, as before.

Two alternative powdered materials were used for comparison: cornstarch and kaolin. Cornstarch showed a similar ability to adsorb the oil it came into contact with; the kaolin was much slower; it rested on the oil surface longer without getting "wet" with oil. In DI water, the powdered cornstarch showed some oil dispersion but to a lesser extent than the mucilage, while none was observed with kaolin. Over the time of the experiment (about 5 min), the cornstarch began to dissolve which made it difficult to remove. The kaolin appeared to saturate with water over a similar time period and spread out on the surface which made it difficult to remove. Pieces of cornstarch-oil aggregate and kaolin sank.

Figure 2:
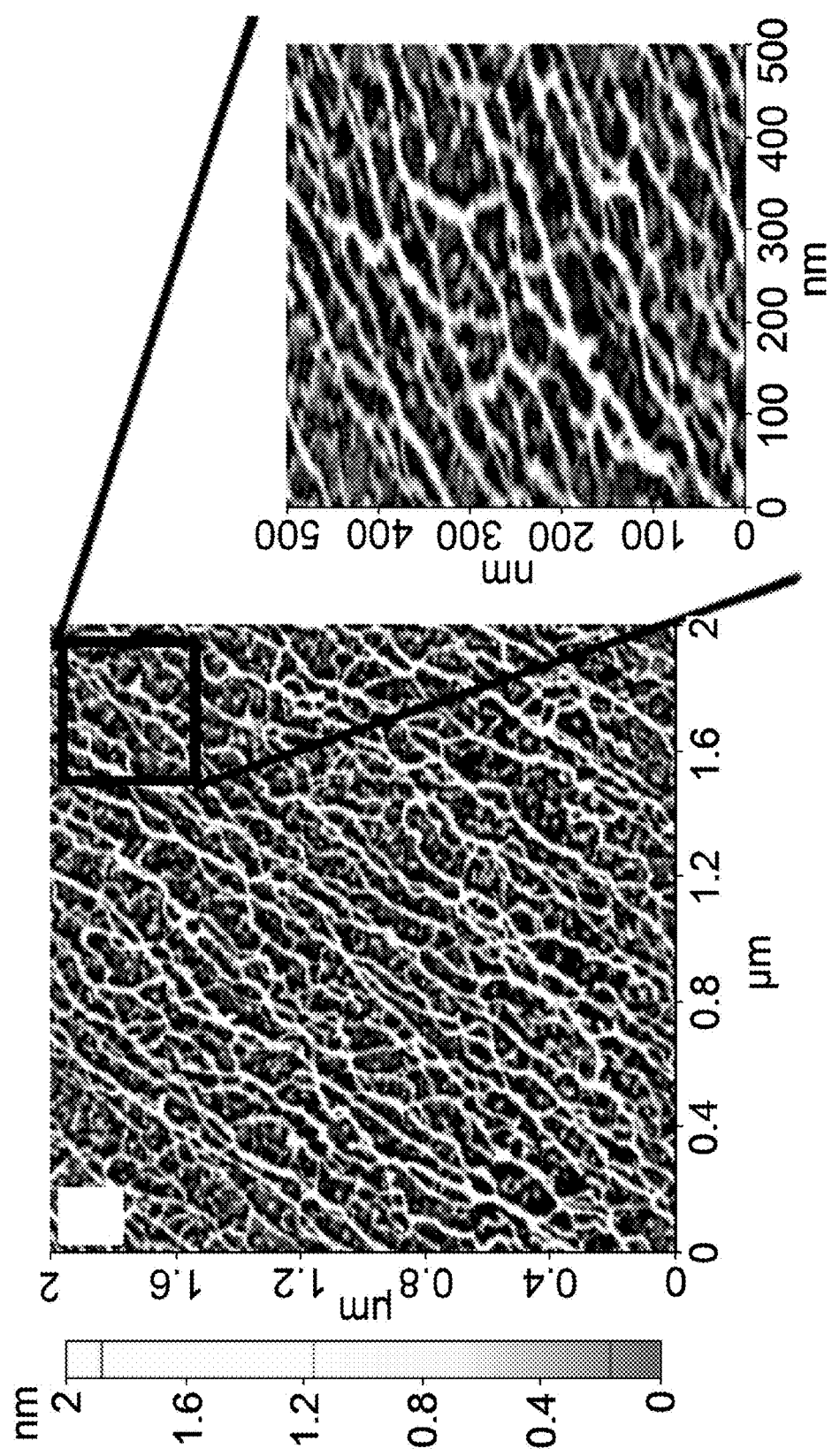
FIG. 2 is an AFM (Atomic Force Microscope) scan of 2×2-µm x-y and 0.5×0.5-µm (insert) x-y areas of natural dispersants obtained from cactus plants.
Figure 3:
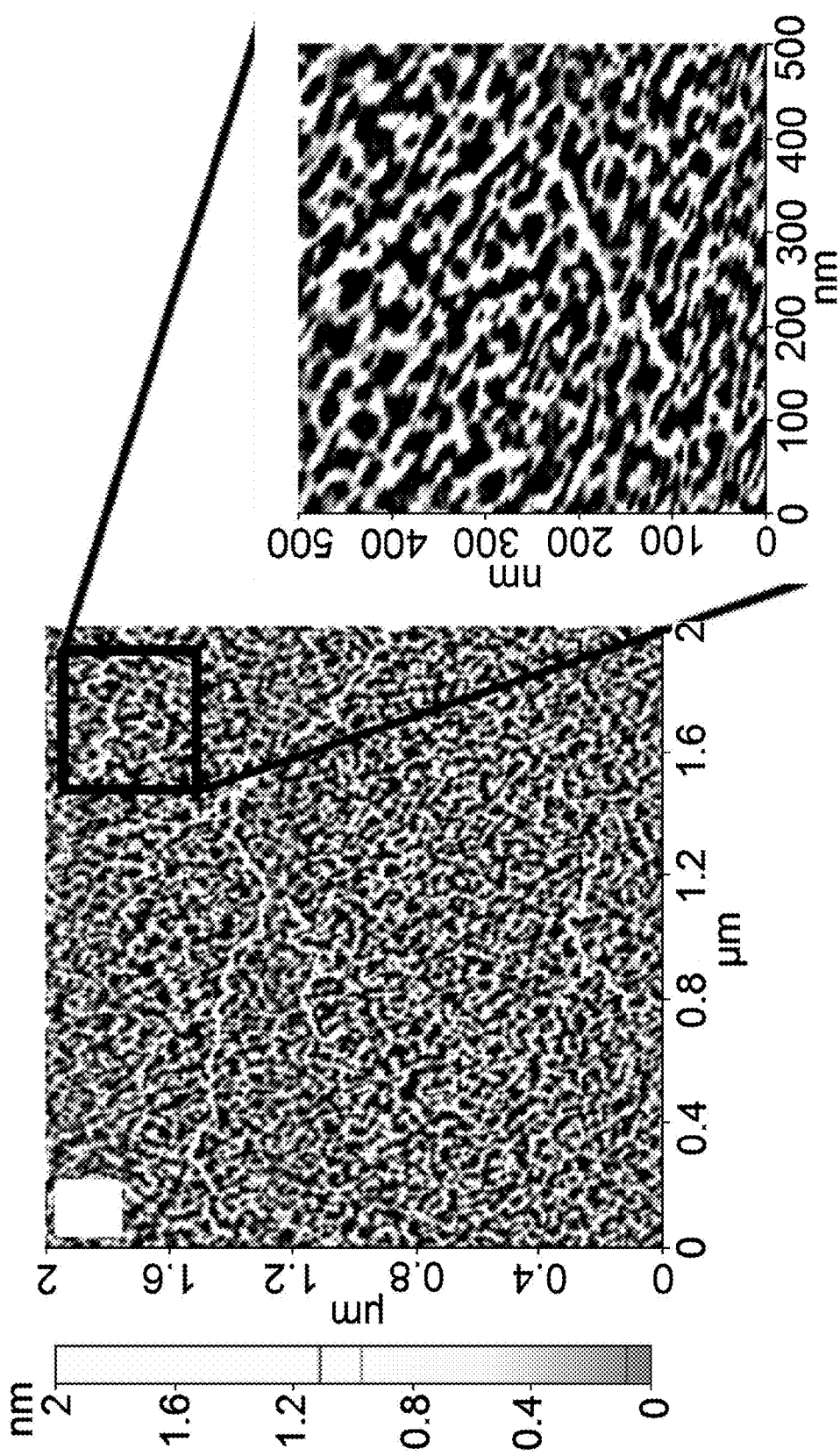
FIG. 3 is an AFM (Atomic Force Microscope) scan of 2×2-µm x-y and 0.5×0.5-µm (insert) x-y areas of natural dispersants obtained from cactus plants.

The powdered mucilage showed a more useful interaction with the oil than the cornstarch or kaolin, which sank within about 10 to 15 seconds. These findings are attributed to better adhesion of the oil to the mucilage particles than to kaolin; the mucilage-oil aggregate remained afloat making it easier to remove; and the fact that the mucilage did not dissolve as quickly which made it easier to remove. FIGS. 2 and 3 show the unusual structure of cactus mucilage, which is quite different than ordinary surfactants. This structure may allow important clues into more efficient surfactants. Also, surprisingly, the cactus mucilage was added without the need for secondary solvents.

The group of Alcantar has already shown that the constituents of cactus mucilage are viable to separate pollutants in water treatment (Young, et al., Using the Mexican cactus as a natural-based process for removing contaminants in drinking water. Polymeric Materials: Science and Engineering Preprints, 2005. 93: p. 965-966; Young, The Mucilage of *Opuntia Ficus Indica*: A Natural, Sustainable, and Viable Water Treatment Technology for Use in Rural Mexico for Reducing Turbidity and Arsenic Contamination in Drinking Water, in Master's thesis. University of South Florida. 2006: Tampa, Fla.; Young, et al., The Mexican Cactus as a New Environmentally Benign Material for the Removal of Contaminants in Drinking Water, in Materials Science of Water Purification, M. A. Shannon, et al., Editors. 2006, Mater. Res. Soc. 930E-0930-JJ01-01: Warrendale, Pa.; Buttice, et al., Removal of sediment and bacteria from water using green chemistry. Environmental Science & Technology, 2010. 44(9): p. 3514-3519; Young, et al., Mucilage of *Opuntia ficus-indica* for use as a flocculant of suspended particulates and arsenic, in Arsenic Contamination of Groundwater: Mechanism, Analysis, and Remediation, S. Ahuja, Editor. 2008, John Wiley and Sons, Inc.: New York).

Example 2

Chitosan is a natural polysaccharide constructed of D-glucosamine and N-acetyl-D-glucosamine derived from crustaceans (Cho and Heuzey, 2008. Dynamic scaling for gelation of a thermosensitive chitosan-beta glycerophosphate hydrogel. Colloid Polym Sci 286:427-434). Solid samples and polymeric solutions (concentrations ranging from 1-500 µl) of low (>10 kDa) and high (50 k-300 kDa) molecular weight fractions of both natural polymers will be investigated. The individual components of the chitosan are separated and characterized using standard structural characterization techniques (FTIR, AFM, SEM, TEM), followed by testing the individual components for surface activity and dispersion properties To test dispersion effectiveness, simple column tests are used to evaluate the partitioning of model oils between the dispersant/water phase. Experiments are performed at least three times for reproducibility and statistical information calculated.

The effective use of novel dispersants and its intrinsic character to modify interfacial processes in complex water systems is described herein. The dispersants are non-toxic, with mucilage and chitosan deriving from natural materials, limiting environmental damage during an oil spill clean-up process.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of a composition and method for treatment of water, it will be apparent to those skilled in the art that variations and modifications are possible without deviating from the broad spirit and principle of the present invention. It is also to be understood that the following claims are intended to cover all of the generic and specific features of the invention herein described, and all statements of the scope of the invention which, as a matter of language, might be said to fall therebetween.

What is claimed is:

1. A method of removing oil-based contaminants from water, comprising
    adding a plant mucilage extract to the water, where the plant mucilage extract is a gelling extract or nongelling extract;
    wherein the gelling extract is an extract obtained from the steps comprising:
        liquefying cactus plant pads, *Hibiscus esculentus* leaves or *Moringa oleifera* leaves to form a first suspension;
        neutralizing the pH of the first suspension;
        centrifuging the first suspension to separate a first precipitate from a liquid supernatant;
        collecting the first precipitate;
        adding sodium chloride to the first precipitate to form a second suspension;
        filtering the second suspension to form a filtrate;
        precipitating the filtrate with acetone or isopropanol to form a gelling plant mucilage extract;
    wherein the nongelling extract is obtained from the steps comprising:
        liquefying cactus plant pads, *Hibiscus esculentus* leaves or *Moringa oleifera* to form a suspension;
        neutralizing the pH of the suspension;
        centrifuging the suspension to separate solids from a liquid supernatant;
        collecting the liquid supernatant;
        mixing the liquid supernatant with a sodium chloride solution to form a pulp;
        adding acetone to the pulp at a ratio of acetone to pulp of 1:2 to form a second precipitate;
        washing the second precipitate with isopropanol or acetone at a ratio of 2:3 precipitate:solvent to form a nongelling plant mucilage extract;
    contacting the plant mucilage extract with the oil-based contaminants;
    allowing the oil-based contaminants in the water to coalesce with the plant mucilage extract to form an oil-mucilage material; and
    allowing the oil-mucilage material to disperse in the water.

2. The method of claim 1, wherein the cactus plant pads are from *Opuntia ficus indica*.

3. The method of claim 2, wherein the plant mucilage extract is stored in dry powder form.

4. The method of claim 1, further comprising drying the gelling plant mucilage extract or the nongelling plant mucilage extract overnight at 20° C. and oven drying overnight at 50° C.

5. The method of claim 4, wherein after drying, the gelling plant mucilage extract or the nongelling plant mucilage extract is ground.

6. The method of claim 1, wherein the sodium chloride solution is added to the liquid supernatant to reach a final concentration of 1M.

7. A method of removing oil-based contaminants from water, comprising:
    adding a dispersant to the water, wherein the dispersant is a plant mucilage extract, or a combination of the plant mucilage extract and chitosan;
    wherein a gelling form of the plant mucilage extract is obtained from the steps comprising:
        liquefying cactus plant pads, *Hibiscus esculentus* leaves or *Moringa oleifera* leaves to form a first suspension;
        neutralizing the pH of the first suspension;
        centrifuging the suspension to separate a first precipitate from a liquid supernatant;
        collecting the first precipitate;
        adding sodium chloride to the first precipitate to form a second suspension;
        filtering the second suspension to form a filtrate;
        precipitating the filtrate with acetone or isopropanol to form a gelling plant mucilage extract;
    wherein a nongelling form of the plant mucilage extract is obtained the steps comprising:
        liquefying cactus plant pads, *Hibiscus esculentus* leaves or *Moringa oleifera* to form a suspension;
        neutralizing the pH of the suspension;
        centrifuging the suspension to separate solids from a liquid supernatant;
        collecting the liquid supernatant;
        mixing the liquid supernatant with a sodium chloride solution to form a pulp;

adding acetone to the pulp at a ratio of acetone to pulp of 1:2 to form a second precipitate;

washing the second precipitate with isopropanol or acetone at a ratio of 2:3 precipitate:solvent to form a nongelling plant mucilage extract;

contacting the dispersant with the oil-based contaminants;

allowing the oil-based contaminants in the water to coalesce with the dispersant to form an oil-dispersant; and allowing the oil-dispersant to disperse in the water.

8. The method of claim 7, wherein the cactus plant pads are from *Opuntia ficus indica*.

9. The method of claim 8, wherein the plant mucilage extract is stored in dry powder form.

10. The method of claim 7, further comprising drying the gelling plant mucilage extract or the nongelling plant mucilage extract overnight at 20° C. and oven drying overnight at 50° C.

11. The method of claim 10, wherein after drying, the gelling plant mucilage extract or the nongelling plant mucilage extract is ground.

12. The method of claim 7, wherein water comprising the oil dispersant is removed from an upper surface of the water.

* * * * *